United States Patent
Sung et al.

(10) Patent No.: US 8,930,785 B2
(45) Date of Patent: Jan. 6, 2015

(54) METHOD FOR TRANSMITTING A DATA BLOCK IN RADIO COMMUNICATION SYSTEM

(75) Inventors: Doo Hyun Sung, Anyang-si (KR); Eun Jong Lee, Anyang-si (KR); Han Gyu Cho, Anyang-si (KR); Jae Hoon Chung, Anyang-si (KR); Kyu Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 12/865,023

(22) PCT Filed: Jun. 10, 2009

(86) PCT No.: PCT/KR2009/003119
§ 371 (c)(1),
(2), (4) Date: Jul. 28, 2010

(87) PCT Pub. No.: WO2009/151278
PCT Pub. Date: Dec. 17, 2009

(65) Prior Publication Data
US 2010/0325507 A1   Dec. 23, 2010

Related U.S. Application Data

(60) Provisional application No. 61/060,130, filed on Jun. 10, 2008, provisional application No. 61/086,455, filed on Aug. 5, 2008.

(51) Int. Cl.
*H04L 1/08* (2006.01)
*H04L 1/18* (2006.01)

(52) U.S. Cl.
CPC ............ *H04L 1/1812* (2013.01); *H04L 1/1867* (2013.01)

USPC .......................................................... 714/749

(58) Field of Classification Search
CPC ................ H04B 2201/709709; H03M 13/353; H03M 13/6306; H03M 13/6337
USPC .......................................................... 714/749
See application file for complete search history.

(56) References Cited

U.S. PATENT DOCUMENTS

| | | | |
|---|---|---|---|
| 7,509,554 B2* | 3/2009 | Lohr et al. | 714/748 |
| 7,979,768 B2* | 7/2011 | Sammour et al. | 714/748 |
| 8,050,248 B2* | 11/2011 | Meyer et al. | 370/349 |
| 8,051,353 B2* | 11/2011 | Maas et al. | 714/748 |
| 8,473,803 B2* | 6/2013 | Jung et al. | 714/749 |
| 8,479,072 B2* | 7/2013 | Chang et al. | 714/748 |
| 8,479,073 B2* | 7/2013 | Lee et al. | 714/748 |
| 8,560,908 B2* | 10/2013 | Duan et al. | 714/748 |

(Continued)

FOREIGN PATENT DOCUMENTS

| | | |
|---|---|---|
| CN | 101084654 A | 12/2007 |
| CN | 101155013 A | 4/2008 |

(Continued)

*Primary Examiner* — Amine Riad
(74) *Attorney, Agent, or Firm* — Birch, Stewart, Kolasch & Birch, LLP

(57) ABSTRACT

A method of transmitting a data block in a wireless communication system is provided. The method includes transmitting the data block, receiving hybrid automatic repeat request (HARQ) not-acknowledgement (NACK) for the data block, receiving an automatic repeat request (ARQ) feedback message indicating a reception state of the data block, and determining whether to retransmit the data block by using the ARQ feedback message.

7 Claims, 30 Drawing Sheets

(56) References Cited

U.S. PATENT DOCUMENTS

| | | | |
|---|---|---|---|
| 8,589,753 B2 * | 11/2013 | Terry et al. | 714/748 |
| 8,751,893 B2 * | 6/2014 | Lohr et al. | 714/751 |
| 2004/0004954 A1 * | 1/2004 | Terry et al. | 370/349 |
| 2004/0009786 A1 * | 1/2004 | Terry | 455/522 |
| 2004/0205105 A1 * | 10/2004 | Larsson et al. | 709/200 |
| 2007/0168826 A1 * | 7/2007 | Terry et al. | 714/748 |
| 2007/0189205 A1 * | 8/2007 | Terry et al. | 370/328 |
| 2009/0077430 A1 * | 3/2009 | Cho et al. | 714/701 |
| 2009/0217120 A1 * | 8/2009 | Sawahashi et al. | 714/750 |
| 2009/0323564 A1 * | 12/2009 | Chiu | 370/280 |
| 2012/0076077 A1 * | 3/2012 | Buckley et al. | 370/328 |

FOREIGN PATENT DOCUMENTS

| | | |
|---|---|---|
| KR | 10-2006-0131808 A | 12/2006 |
| WO | WO 2005/008947 A1 | 1/2005 |
| WO | WO 2006/065188 A1 | 6/2006 |

\* cited by examiner

FIG. 13

| SN: | 10 | 11 | 12 | 13 | 14 | 15 | 16 | 17 | 18 | 19 | 20 |
|---|---|---|---|---|---|---|---|---|---|---|---|
|  | A | A | N | A | A | A | N | A | A | N | A |

FIG. 22

| NACK_SN_1 | NACK_SN_2 | · · · | NACK_SN_n |

FIG. 26

| LAST (1) | EH Type=ARQ feedback |||||
|---|---|---|---|---|---|
| Cumulative ACK_SN (8) ||||||
| Cumulative ACK_SN (2) | END (1) | Selective NACK ||||

METHOD FOR TRANSMITTING A DATA BLOCK IN RADIO COMMUNICATION SYSTEM

This application is a National Phase of PCT/KR2009/003119 filed on Jun. 10, 2009, which claims priority under 35 U.S.C. 119(e) to U.S. Provisional Application Nos. 61/060,130 filed Jun. 10, 2008 and 61/086,455 filed Aug. 5, 2008, all of which are hereby incorporated by reference into the present application.

TECHNICAL FIELD

The present invention relates to wireless communications, and more particularly, to a method of transmitting a data block in a wireless communication system.

BACKGROUND ART

In next generation multimedia mobile communication systems, which have been actively studied in recent years, there is a demand for a system capable of processing and transmitting a variety of information (e.g., video and radio data) in addition to the early-stage voice service. The wireless communication system is designed for the purpose of providing reliable communication to a plurality of users irrespective of their locations and mobility. However, a wireless channel has an abnormal characteristic such as a fading phenomenon caused by a path loss, noise, and multi-path, an inter-symbol interference (ISI), a Doppler effect caused by mobility of a mobile station, etc. Therefore, various techniques have been developed to overcome the abnormal characteristic of the wireless channel and to increase reliability of wireless communication.

Automatic repeat request (ARQ) is one of techniques for increasing reliability of wireless communication. The ARQ is a technique for retransmitting data by a transmitter when a receiver fails to receive the data. In addition, hybrid automatic repeat request (HARQ) is a technique in which the ARQ is combined with forward error correction (FEC).

In order to increase reliability of wireless communication while supporting a high-speed data service, a wireless communication process is preferably implemented with a plurality of independent hierarchical layers rather than one single-layer. A structure of the plurality of hierarchical layers is called a protocol stack. The protocol stack may refer to an open system interconnection (OSI) model which is a widely known protocol for communication systems.

The ARQ and the HARQ are implemented in different layers. A layer capable of performing the HARQ is called an HARQ entity. A layer capable of performing the ARQ is called an ARQ entity. In general, the ARQ and the HARQ are independently performed. However, performance may deteriorate when the ARQ and the HARQ are independently performed. This is because fast recovery cannot be achieved by the ARQ entity when there is a problem unsolvable by the HARQ entity. As a result, reliability of wireless communication is decreased. Accordingly, there is a need for a method of transmitting a data block by interaction between the ARQ and the HARQ.

DISCLOSURE

Technical Problem

The present invention provides a method of transmitting a data block in a wireless communication system.

Technical Solution

In an aspect, a method of transmitting a data block in a wireless communication system is provided. The method includes transmitting the data block, receiving hybrid automatic repeat request (HARQ) not-acknowledgement (NACK) for the data block, receiving an automatic repeat request (ARQ) feedback message indicating a reception state of the data block, and determining whether to retransmit the data block by using the ARQ feedback message.

In another aspect, a method of performing ARQ in a wireless communication system is provided. The method includes receiving a data block, transmitting HARQ NACK for the data block, and transmitting an ARQ feedback message indicating that reception of the data block has failed.

In still another aspect, an apparatus for wireless communication is provided. The apparatus includes a radio frequency (RF) unit, and a processor coupled with the RF unit and configured for receiving a data block, receiving HARQ NACK for the data block, receiving an ARQ feedback message indicating a reception state of the data block, and determining whether to retransmit the data block by using the ARQ feedback message.

Advantageous Effects

A method of effectively performing automatic repeat request (ARQ) in a wireless communication system is provided. Therefore, overall system performance can be improved.

DESCRIPTION OF DRAWINGS

FIG. 13 shows a first example of an acknowledgment (ACK) bitmap.

FIG. 22 shows a first example of a selective not-acknowledgment (NACK).

FIG. 26 shows another example of an ARQ feedback extended header format.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16e/IEEE 802.16m for clarity of explanation, the technical features of the present invention are not limited thereto.

Figure 1:
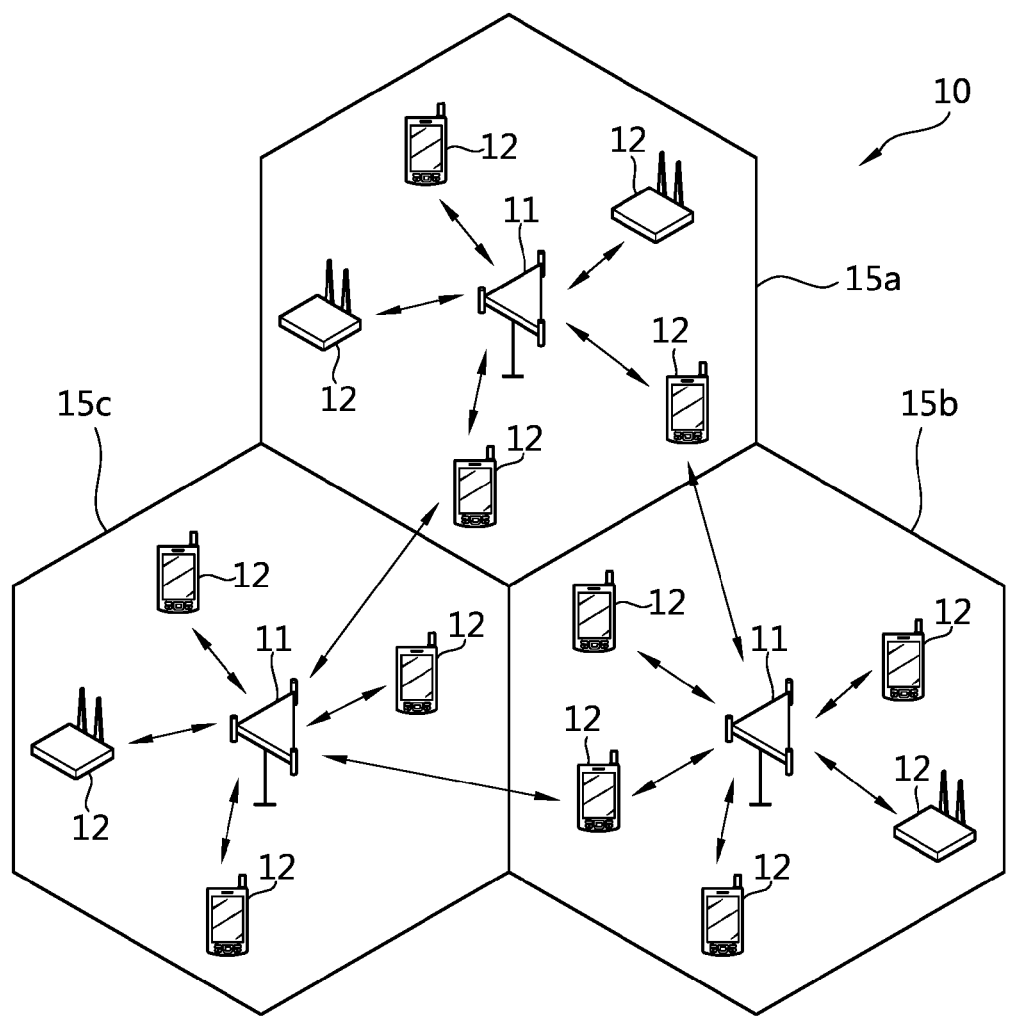
FIG. 1 shows a wireless communication system.

FIG. 1 shows a wireless communication system.

Referring to FIG. 1, a wireless communication system 10 includes at least one base station (BS) 11. Each BS 11 provides communication services to specific geographical regions (generally referred to as cells) 15a, 15b, and 15c. Each cell can be divided into a plurality of regions (referred to as sectors). A mobile station (MS) 12 may be fixed or mobile, and may be referred to as another terminology, such as a user equipment (UE), a user terminal (UT), a subscriber station (SS), a wireless device, a personal digital assistant (PDA), a wireless modem, a handheld device, etc. The BS 11 is generally a fixed station that communicates with the MS 12 and may be referred to as another terminology, such as an evolved node-B (eNB), a base transceiver system (BTS), an access point, etc.

Hereinafter, downlink (DL) denotes a communication link from the BS to the MS, and uplink (UL) denotes a communication link from the MS to the BS. In the DL, a transmitter may be a part of the BS, and a receiver may be a part of the MS. In the UL, the transmitter may be a part of the MS, and the receiver may be a part of the BS.

Figure 2:
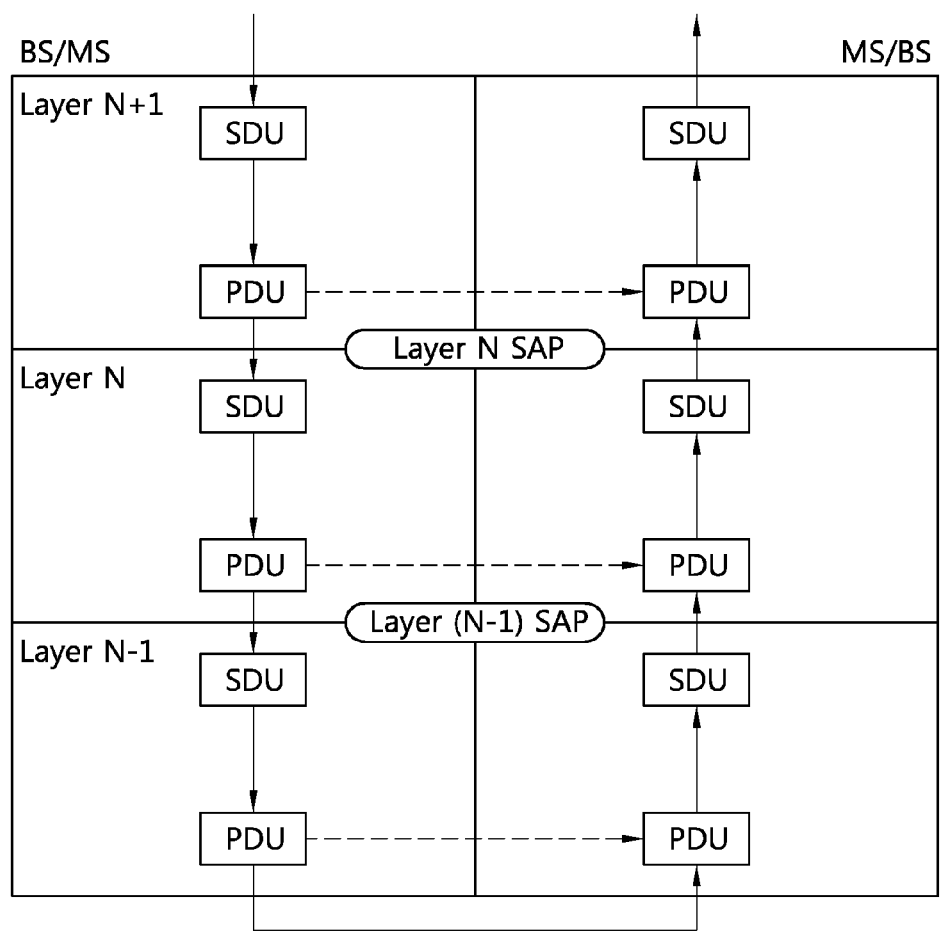
FIG. 2 is a block diagram showing a protocol stack.

FIG. 2 is a block diagram showing a protocol stack.

Referring to FIG. 2, the protocol stack consists of a plurality of layers N−1, N, and N+1. The layer N+1 is a higher layer of the layer N. The layer N−1 is a lower layer of the layer N.

A protocol data unit (PDU) is a block which is transmitted and received by a specific layer to and from a peer layer via a lower layer. That is, the specific layer transmits the PDU to the lower layer or receives the PDU from the lower layer. The PDU is hereinafter referred to as a lower data block. A service data unit (SDU) is a block which is received by a specific layer from a higher layer or is transmitted by the specific layer to the higher layer. The SDU is hereinafter referred to as a higher data block.

Blocks are transferred between layers via a service access point (SAP). A layer N SAP is an SAP between the layer N+1 and the layer N. A layer (N−1) SAP is an SAP between the layer N and the layer N−1.

The protocol stack may refer to open system interconnection (OSI) model which is a widely known protocol for communication systems. For example, the layer N−1 may be a physical layer, the layer N may be a medium access control (MAC) layer, and the layer N+1 may be a network layer. The MAC layer controls the physical layer and generates an MAC PDU. The MAC layer can perform automatic repeat request (ARQ). The physical layer receives the MAC PDU from the MAC layer, and then generates and transmits a radio signal by using the MAC PDU.

Figure 3:
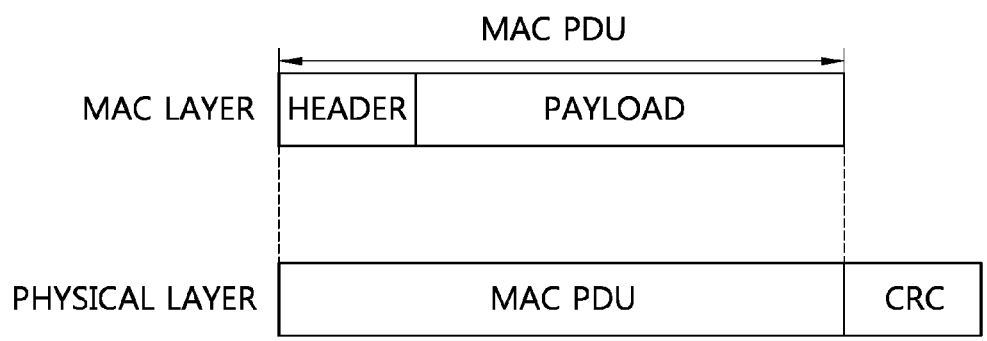
FIG. 3 shows an example of transmitting a medium access control (MAC) protocol data unit (PDU) from an MAC layer to a physical layer.

FIG. 3 shows an example of transmitting an MAC PDU from an MAC layer to a physical layer.

Referring to FIG. 3, an MAC PDU is generated in the MAC layer. The MAC PDU includes a header and a payload. The MAC PDU may further include cyclic redundancy check (CRC). Whether the MAC PDU includes the payload and the CRC is optional. That is, the MAC PDU may consist of only the header.

The header includes general information of the MAC PDU. The header may include a header type (HT) field, an encryption control (EC) field, a connection identifier (CID) field, a type field, an extended header (EH) field, a length (LEN) field, etc.

The HT field indicates a type of header. A field included in the header may differ depending on a value of the HT field. The EC field indicates whether the payload is encrypted. The CID field indicates a CID. The CID is an identifier for identifying each of connections in an MS. The IEEE 802.16m defines an MS identifier (ID) for identifying the MS and a flow ID for identifying each connection flow in the MS. The MS ID is used for physical layer control signaling. The header of the MAC PDU may include the flow ID instead of the CID. The EH field indicates whether the header is followed by an additional extended header. The LEN field indicates a length of the MAC PDU. The type field indicates a type of subheader and a type of special payload. The type of subheader and the type of special payload may be indicated in a bitmap format. The type field may indicate a presence or absence of an ARQ feedback message, a fragmentation subheader (FSH), a packing subheader (PSH), etc., in the payload.

The FSH includes a fragmentation control (FC) field and a sequence number (SN) field. The PSH includes an FC field, an LEN field, and an SN field. The FC field indicates a fragmentation state of the payload. The LEN field indicates a length of an SDU fragment including the PSH. The SN field indicates an SN of a data block.

The payload includes at least one or more MAC SDUs or MAC SDU fragments. One MAC SDU may be fragmented into two or more MAC SDUs, and the fragments may be included in different MAC PDUs. In addition, one MAC PDU may be packed with different MAC SDUs and/or MAC SDI fragments.

The physical layer generates a packet by attaching CRC to the MAC PDU. The packet may be channel-coded and modulated in the physical layer. The physical layer converts the packet into a radio signal and transmits the radio signal.

The physical layer may perform hybrid automatic repeat request (HARQ). In general, a receiver for performing the HARQ attempts to perform error correction for a received packet, and uses an error detection code to determine whether retransmission is necessary. CRC may be used as the error detection code. If no error is detected from the packet in the CRC detection process, the receiver determines that decoding of the packet has succeeded. In this case, the receiver transmits HARQ acknowledgment (ACK) to a transmitter. If an error is detected from the packet in the CRC detection process, the receiver determines that decoding of the packet has failed. In this case, the receiver transmits HARQ not-acknowledgment (NACK) to the transmitter. The transmitter can retransmit the packet upon receiving the HARQ NACK.

Hereinafter, a layer capable of performing the HARQ is called an HARQ entity, and a layer capable of performing the ARQ is called an ARQ entity. The ARQ entity may or may not perform the ARQ. When the ARQ entity performs the ARQ, it is called an ARQ-enabled connection. When the ARQ entity does not perform the ARQ, it is called a non-ARQ connection. It is assumed that the ARQ entity manages both the ARQ-enabled connection and the non-ARQ connection. The ARQ entity may be a higher layer of the HARQ entity. For example, the HARQ entity may be the physical layer. The ARQ entity may be the MAC layer or a radio link control (RLC) layer, i.e., a higher layer of the MAC layer.

Figure 4:
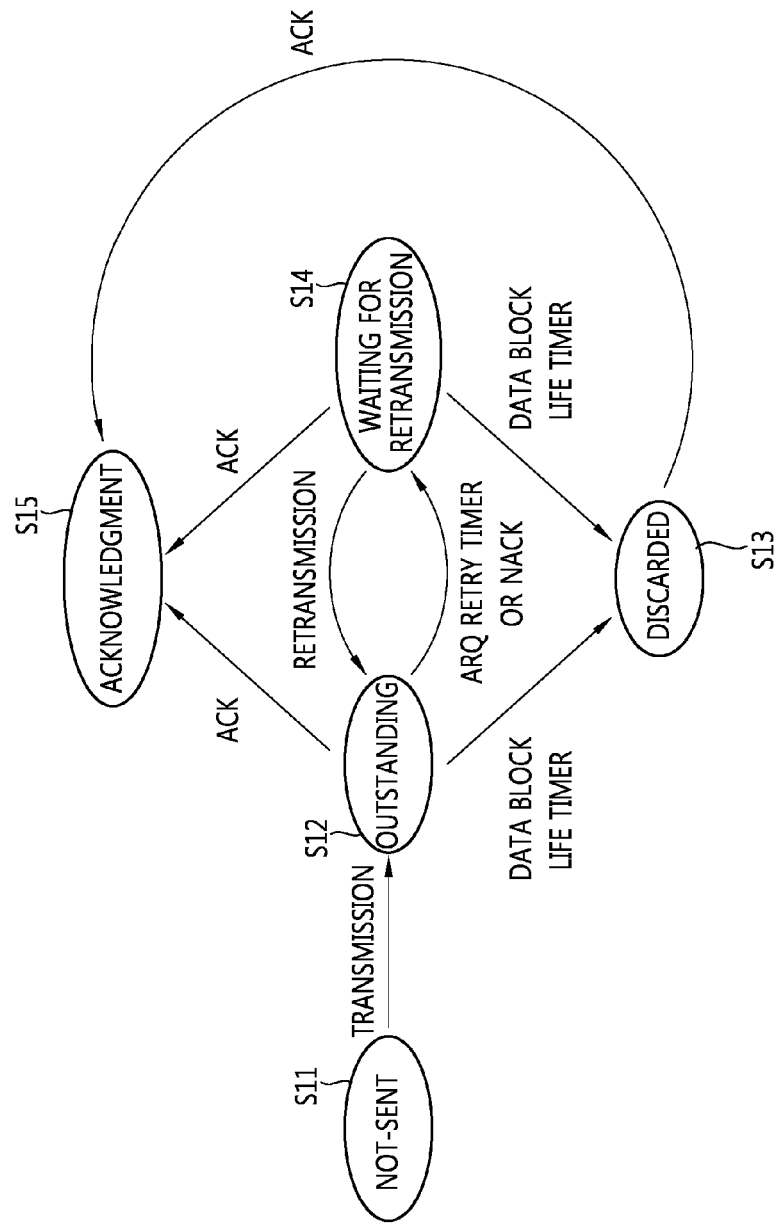
FIG. 4 shows an example of a state diagram of a data block in an automatic repeat request (ARQ) entity.

FIG. 4 shows an example of a state diagram of a data block in an ARQ entity.

Referring to FIG. 4, a state of the data block is any one of a not-sent state S11, an outstanding state S12, a discarded state S13, a waiting for retransmission state S14, and an acknowledgment state S15.

Hereinafter, the data block is a data unit for performing ARQ. When the ARQ entity is an MAC layer, the ARQ may be performed on an MAC PDU basis. In this case, the data block is an MAC PDU. The data block may be MAC SDUs (or MAC SDU fragments) included in the MAC PDU. The data block may be fragments obtained by logically fragmenting an MAC SDU according to a predetermined size. Otherwise, the data block may be generated from one or more MAC SDUs or one or more MAC SDU fragments. The size of data block may be constant or variant according to the predetermined size.

If the data block is transmitted in the not-sent state S11, the data block transitions to the outstanding state S12. The data block in the outstanding state S12 may transition to the discarded state S13, the waiting for retransmission state S14, or the acknowledgment state S15. If ACK is received in the outstanding state S12, the data block transitions from the outstanding state S12 to the acknowledgment state S15. If a data block life timer expires in the outstanding state S12, the data block transitions from the outstanding state S12 to the discarded state S13. If an ARQ retry timer expires or NACK is received in the outstanding state S12, the data block transitions from the outstanding state S12 to the waiting for retransmission state S14. If the data block is retransmitted in the waiting for retransmission state S14, the data block transitions from the waiting for retransmission state S14 to the outstanding state S12. If ACK is received in the waiting for retransmission state S14, the data block transitions from the waiting for retransmission state S14 to the acknowledgment state S15. If the data block life timer expires in the waiting for retransmission state S14, the data block transitions from the waiting for retransmission state S14 to the discarded state S13. If ACK is received in the discarded state S13, the data block transitions from the discarded state S13 to the acknowledgment state S15.

Herein, ACK or NACK for the data block is transmitted by using an ARQ feedback message. The ARQ feedback message indicates a reception state of the data block. The ARQ feedback message is transmitted to an ARQ entity of a transmitter by an ARQ entity of a receiver receiving the data block. By using only the ARQ feedback message, the transmitter can know whether transmission of the data block has succeeded. That is, an interaction does not exist between the ARQ entity and the HARQ entity in a process of performing ARQ.

A CID is used to identify a connection between an MS and a BS in an IEEE 802.16e system. HARQ may be applied for the connection. When generating an MAC PDU of the connection, an MAC SDU may be subjected to fragmentation and packing, and whether to apply ARQ is determined as well. An ARQ-enabled connection and a non-ARQ connection are determined according to whether to apply ARQ. Whether to support HARQ, fragmentation, packing, ARQ, etc., can be determined by negotiation between the BS and the MS. Examples of the negotiation between the BS and the MS include dynamic service addition request (DSA-REQ)/dynamic service addition response (DSA-RSP) exchange, SS-basis capability request (SBC-REQ)/SS-basic capability response (SBC-RSP) exchange, etc. The DSA-REQ may be transmitted by the BS or the MS to generate a new service flow. The DSA-RSP is transmitted in response to the DSA-REQ. The SBC-REQ is transmitted by the MS during initialization. The SBC-REQ includes information on capability supportable by the MS for effective communication between the MS and the BS. The SBC-RSP is transmitted in response to the SBC-REQ. It is assumed that both HARQ and ARQ are applied for a certain connection in the IEEE 802.16e system. The HARQ entity and the ARQ entity independently operate. Operations of the respective entities are transparent to each other.

The following problems may occur when the HARQ entity and the ARQ entity operate independently from each other.

First, the transmitter may not be able to verity the ARQ feedback message for the data block due to deterioration of a wireless channel condition. In this case, the transmitter has to retransmit the data block unconditionally at the expiry of the ARQ retry timer.

Second, a physical-layer signaling error may occur which is unrecoverable by the HARQ entity. The physical-layer signaling error may be an HARQ feedback error. In case of the HARQ feedback error, system performance may deteriorate since fast recovery cannot be achieved by the ARQ entity. Examples of the HARQ feedback error include an ACK-NACK error when HARQ ACK is received as HARQ NACK and an NACK-ACK error when HARQ NACK is received as HARQ ACK. The ACK-NACK error occurs when HARQ NACK received by the transmitter is actually HARQ ACK.

The NACK-ACK error occurs when HARQ ACK received by the transmitter is actually HARQ NACK.

The NACK-ACK error is defined as a case where the receiver transmits HARQ NACK to the transmitter when CRC decoding of a first packet has failed, but the transmitter mistakenly recognizes the HARQ NACK as HARQ ACK. In this case, the transmitter recognizes that the first packet is correctly received, and thus does not retransmit the first packet. The transmitter generates a new MAC PDU, and transmits a second packet obtained by attaching CRC to the MAC PDU. The receiver receives the second packet without retransmission of the first packet. The ARQ entity has discontinuous portions in sequence numbers (SNs) of data blocks. This problem is unsolvable by the HARQ entity in case of downlink transmission.

To solve the above problem, a method for supporting an interaction between ARQ and HARQ can be taken into consideration. An additional operation considering the interaction between ARQ and HARQ can be defined.

Whether the interaction between ARQ and HARQ is supported may be determined by negotiation between a BS and an MS. For example, the BS and the MS may determine whether to support the interaction between ARQ and HARQ by using DSA-REQ/DSA-RSP, SBC-REQ/SBC-RSP, or a new MAC management message.

There is a method of using an HARQ feedback and an ARQ feedback during the interaction between ARQ and HARQ. In this method, an ARQ entity of a transmitter performs ARQ by using HARQ ACK/NACK for HARQ transmission. The transmitter can obtain an SN of a successfully (or unsuccessfully) transmitted data block from the HARQ ACK/NACK.

Figure 5:
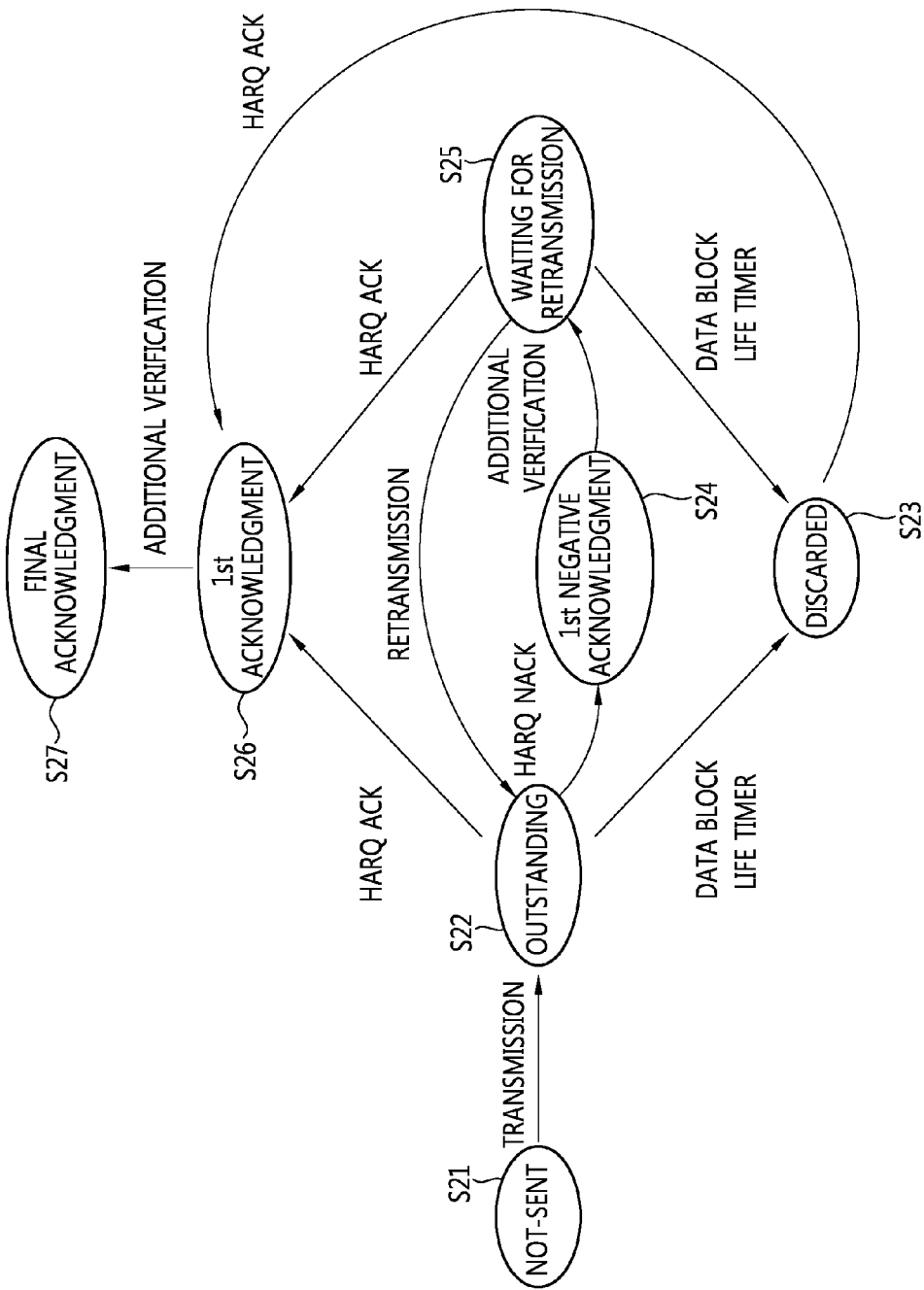
FIG. 5 shows an example of a state diagram of a data block in an ARQ entity interacting with a hybrid automatic repeat request (HARQ) entity.

FIG. 5 shows an example of a state diagram of a data block in an ARQ entity interacting with an HARQ entity.

Referring to FIG. 5, a state of the data block is any one of a not-sent state S21, an outstanding state S22, a discarded state S23, a $1^{st}$ negative acknowledgment state S24, a waiting for retransmission state S25, a $1^{st}$ acknowledgment state S26, and a final acknowledgment state S27.

The data block in the outstanding state S22 may transition to the discarded state S23, the $1^{st}$ negative acknowledgment state S24, or the $1^{st}$ acknowledgment state S26. If HARQ ACK is received in the outstanding state S22, the data block transitions from the outstanding state S22 to the $1^{st}$ acknowledgment state S26. If HARQ NACK is received in the outstanding state S22, the data block transitions from the outstanding state S22 to the $1^{st}$ negative acknowledgment state S24. If additional verification is made in the $1^{st}$ negative acknowledgment state S24, the data block transitions from the $1^{st}$ negative acknowledgment state S24 to the waiting for retransmission state S25. If HARQ ACK is received in the waiting for retransmission state S25, the data block transitions from the waiting for retransmission state S25 to the $1^{st}$ acknowledgment state S26. If additional verification is made in the $1^{st}$ acknowledgment state S26, the data block transitions from the $1^{st}$ acknowledgment state S26 to the final acknowledgment state S27. The content described above with reference to FIG. 4 may equally apply to other unexplained state transitions.

As such, even for an SN of a data block acknowledged with HARQ NACK, the ARQ entity may reserve retransmission of the data block until additional verification is made. In addition, even for an SN of a data block acknowledged with HARQ ACK, the ARQ entity may reserve final verification until additional verification is made.

The final verification may be expiry of an additional timer or reception of an ARQ feedback message from the receiver.

An example of using the additional timer for the additional verification will be described. If HARQ ACK/NACK is received for a data block, the ARQ entity of the transmitter starts the additional timer. If the additional timer expires after receiving the HARQ ACK, the ARQ entity finally acknowledges the data block. If the additional timer expires after receiving HARQ NACK, the ARQ entity retransmits the data block. After starting the additional timer, if the ARQ entity receives information on a reception state different from that of HARQ ACK/NACK by which the additional timer starts, the additional timer may stop. The additional timer may operate for each data block. Alternatively, instead of operating the additional timer for each data block, the ARQ entity may retransmit the data block or may decide to discard the data block.

Next, a case of using an ARQ feedback message as additional verification will be described.

Figure 6:
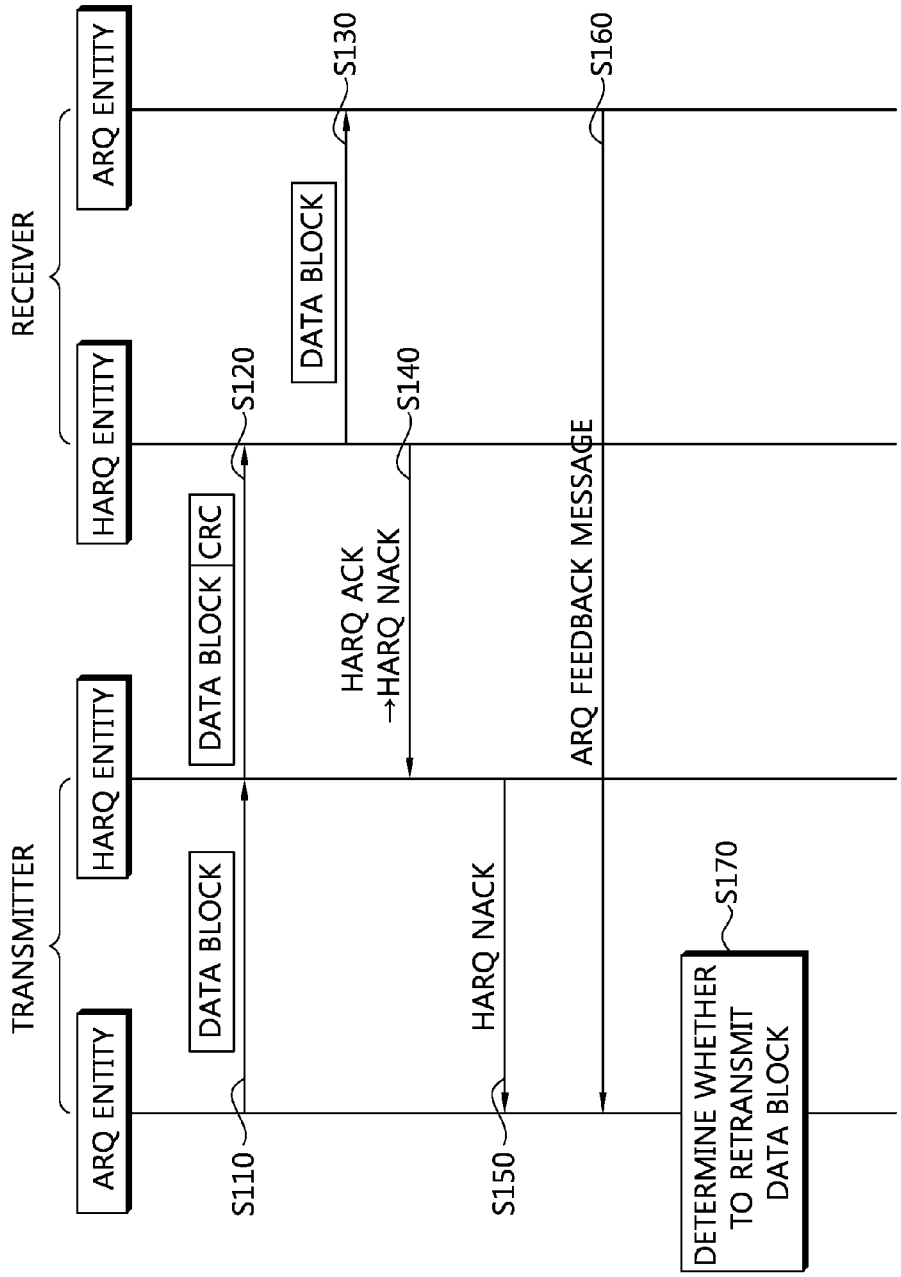
FIG. 6 is a flow diagram showing a method of transmitting a data block according to an embodiment of the present invention.

FIG. 6 is a flow diagram showing a method of transmitting a data block according to an embodiment of the present invention.

Referring to FIG. 6, an ARQ entity of a transmitter generates a data block, and transmits the data block to an HARQ entity of the transmitter (step S110). The HARQ entity of the transmitter attaches CRC to the data block, and transmits the CRC-attached data block to an HARQ entity of a receiver (step S120). The HARQ entity of the receiver attempts decoding of the data block by performing CRC checking. It is assumed herein that decoding of the data block has succeeded. The HARQ entity of the receiver transmits the data block to the an ARQ entity of the receiver (step S130). The HARQ entity of the receiver transmits HARQ ACK for the data block, but the HARQ entity of the transmitter receives HARQ NACK due to an ACK-NACK error (step S140). The HARQ NACK is transmitted from the HARQ entity of the transmitter to the ARQ entity of the transmitter (step S150). The data block is in a $1^{st}$ negative acknowledgment state in the ARQ entity of the transmitter. In this case, the transmitter does not recognize the ACK-NACK error. The ARQ entity of the transmitter receives an ARQ feedback message as additional verification from the ARQ entity of the receiver (step S160). The ARQ entity of the transmitter determines whether to retransmit the data block by using the ARQ feedback message (step S170). If the ARQ feedback message indicates that reception of the data block has failed, the ARQ entity of the transmitter may retransmit the data block. If the ARQ feedback message indicates the reception of the data block has succeeded, the ARQ entity of the transmitter does not retransmit the data block.

Figure 7:
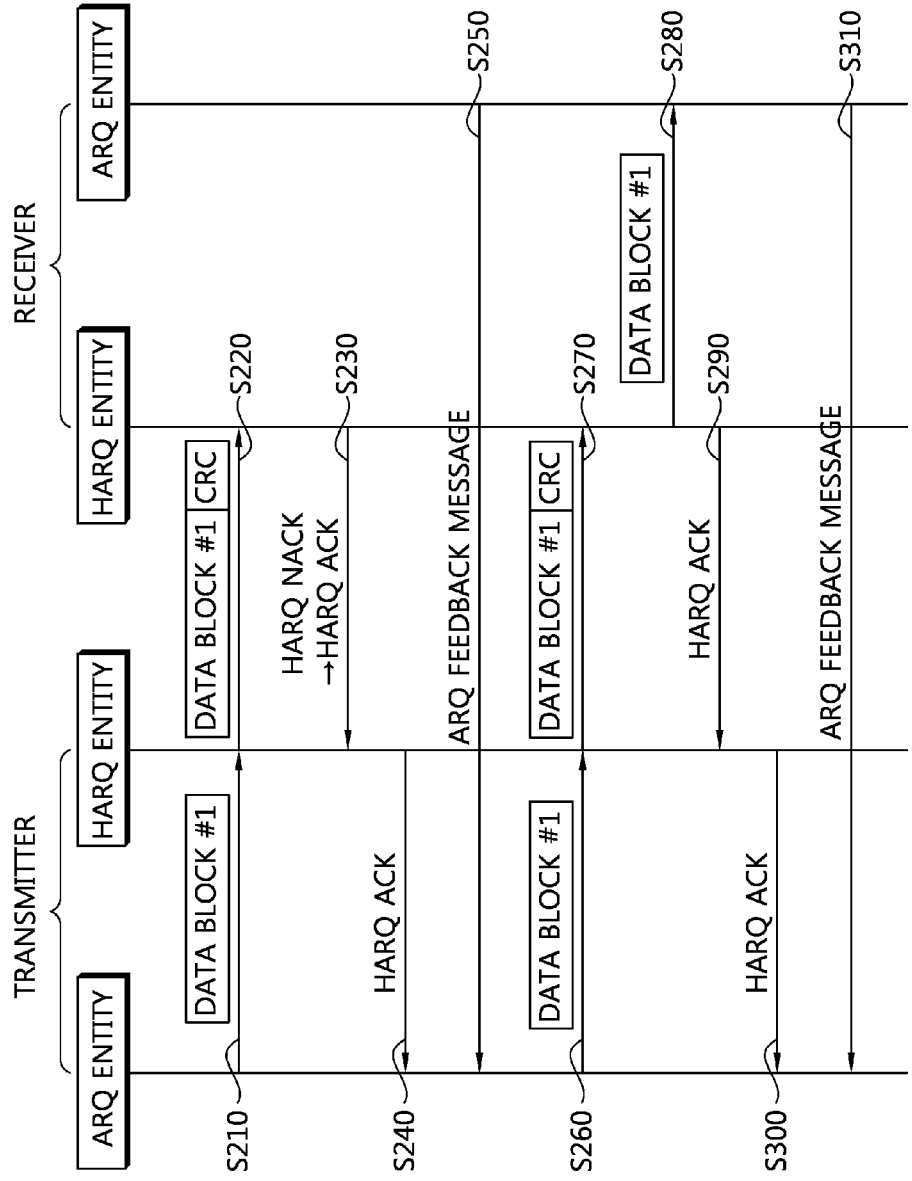
FIG. 7 is a flow diagram showing a method of performing ARQ according to another embodiment of the present invention.

FIG. 7 is a flow diagram showing a method of performing ARQ according to another embodiment of the present invention.

Referring to FIG. 7, an ARQ entity of a transmitter generates a data block #1, and transmits the data block #1 to an HARQ entity of the transmitter (step S210). The HARQ entity of the transmitter attaches CRC to the data block #1, and transmits the CRC-attached data block #1 to an HARQ entity of a receiver (step S220). The HARQ entity of the receiver attempts decoding of the data block #1 by performing CRC checking. It is assumed herein that the decoding of the data block #1 has failed due to a CRC error. The HARQ entity of the receiver transmits HARQ NACK for the data block #1, but the HARQ entity of the transmitter receives HARQ ACK due to an NACK-ACK error (step S230). The HARQ ACK is transmitted from the HARQ entity of the transmitter to the ARQ entity of the transmitter (step S240). The data block #1 is in a $1^{st}$ negative acknowledgment state in the ARQ entity of the transmitter. In this case, the transmitter does not recognize the NACK-ACK error. The ARQ entity of the transmitter determines whether to retransmit the data block by using the ARQ feedback message (step S250). It is assumed herein that the ARQ feedback message indicates that reception of the data block #1 has failed. The ARQ entity of the transmitter retransmits the data block #1 to the HARQ entity of the transmitter (step S260). The HARQ entity of the transmitter attaches CRC to the data block #1, and retransmits the CRC-attached data block #1 to the HARQ entity of the receiver (step S270).

The HARQ entity of the receiver attempts decoding of the retransmitted data block #1 by performing CRC checking. It is assumed herein that the decoding of the retransmitted data block #1 has succeeded. The HARQ entity of the receiver transmits the data block #1 to the ARQ entity of the receiver (step S280). The HARQ entity of the receiver transmits HARQ ACK for the data block #1 (step S290). The HARQ ACK is transmitted from the HARQ entity of the transmitter to the ARQ entity of the transmitter (step S300). The data block #1 is in the $1^{st}$ acknowledgment state in the ARQ entity of the transmitter. The ARQ entity of the transmitter receives an ARQ feedback message from the ARQ entity of the receiver by performing additional verification (step S310). If the ARQ feedback message indicates that reception of the data block #1 has succeeded, the data block #1 transitions from the $1^{st}$ acknowledgment state to a final acknowledgment state.

In this case, a method of triggering the ARQ feedback message by the ARQ entity of the receiver has the following problems.

First, the transmitter may trigger the ARQ feedback message by transmitting a polling indicator. That is, upon receiving the polling indicator for triggering transmission of the ARQ feedback message, the receiver transmits the ARQ feedback message. The polling indicator may be transmitted in a form of a field included in an MAC header or an MAC management message.

Second, the receiver may periodically triggers the ARQ feedback message. That is, the ARQ feedback message is periodically transmitted. A period of triggering the ARQ feedback message may be determined in a negotiation process between a BS and an MS.

Third, the ARQ feedback message may be non-periodically triggered. Next, an exemplary case of non-periodically triggering the ARQ feedback message will be described. The ARQ entity of the receiver may use an ARQ window to perform ARQ. The ARQ window corresponds to a range of SNs of data blocks for which ARQ is performed. A window start number is updated upon receiving a data block of an SN corresponding to the window start number of the ARQ window. The ARQ entity may start a purge timer upon receiving a data block of an SN different from the window start number. After starting the purge timer, the purge timer may stop upon receiving a data block of an SN corresponding to the window start number. If the purge timer expires, the ARQ feedback message may be triggered.

Fourth, the ARQ feedback message may be triggered by internal signaling between the HARQ entity and the ARQ entity of the receiver. In this method, the ARQ feedback message can be transmitted faster than other methods of triggering the ARQ feedback message. The internal signaling can be achieved by configuring a signaling route between the HARQ entity and the ARQ entity.

Figure 8:
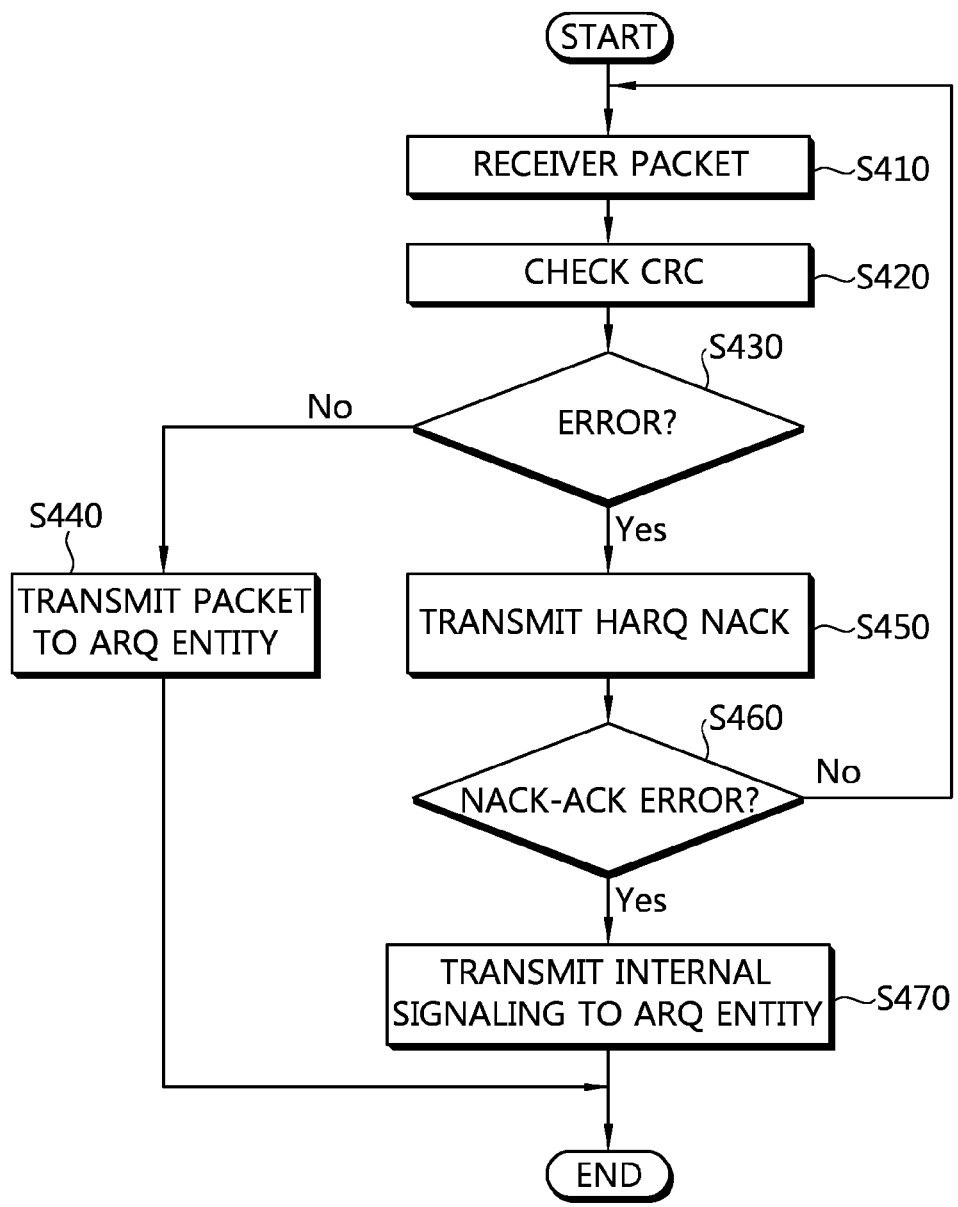
FIG. 8 is a flowchart showing a case where an ARQ feedback message is triggered by internal signaling in an HARQ entity of a receiver.

FIG. 8 is a flowchart showing a case where an ARQ feedback message is triggered by internal signaling in an HARQ entity of a receiver.

Referring to FIG. 8, the HARQ entity receives a packet (step S410). Herein, the packet is a CRC-attached data block. The HARQ entity checks CRC of the packet (step S420). The HARQ entity detects an error by performing CRC checking (step S430). If no error is detected, the HARQ entity transmits the packet to an ARQ entity (step S440). If an error is detected, the HARQ entity transmits HARQ NACK (step S450). The HARQ entity detects an NACK-ACK error (step S460). If the NACK-ACK error is not detected, the HARQ entity receives a packet again (step S410). If the NACK-ACK error is detected, the HARQ entity transmits internal signaling to the ARQ entity (step S470). In this case, the internal signaling is for reporting occurrence of the NACK-ACK error to the ARQ entity.

The HARQ entity may detect the NACK-ACK error when the packet is not received again after HARQ NACK is transmitted. For one example, if the packet is not received again during a specific duration after the HARQ NACK is transmitted, the HARQ entity may determine that the NACK-ACK error occurs. For another example, if a second packet is initially transmitted without retransmission of the packet after the HARQ NACK is transmitted, the HARQ entity may determine that the NACK-ACK error occurs.

Figure 9:
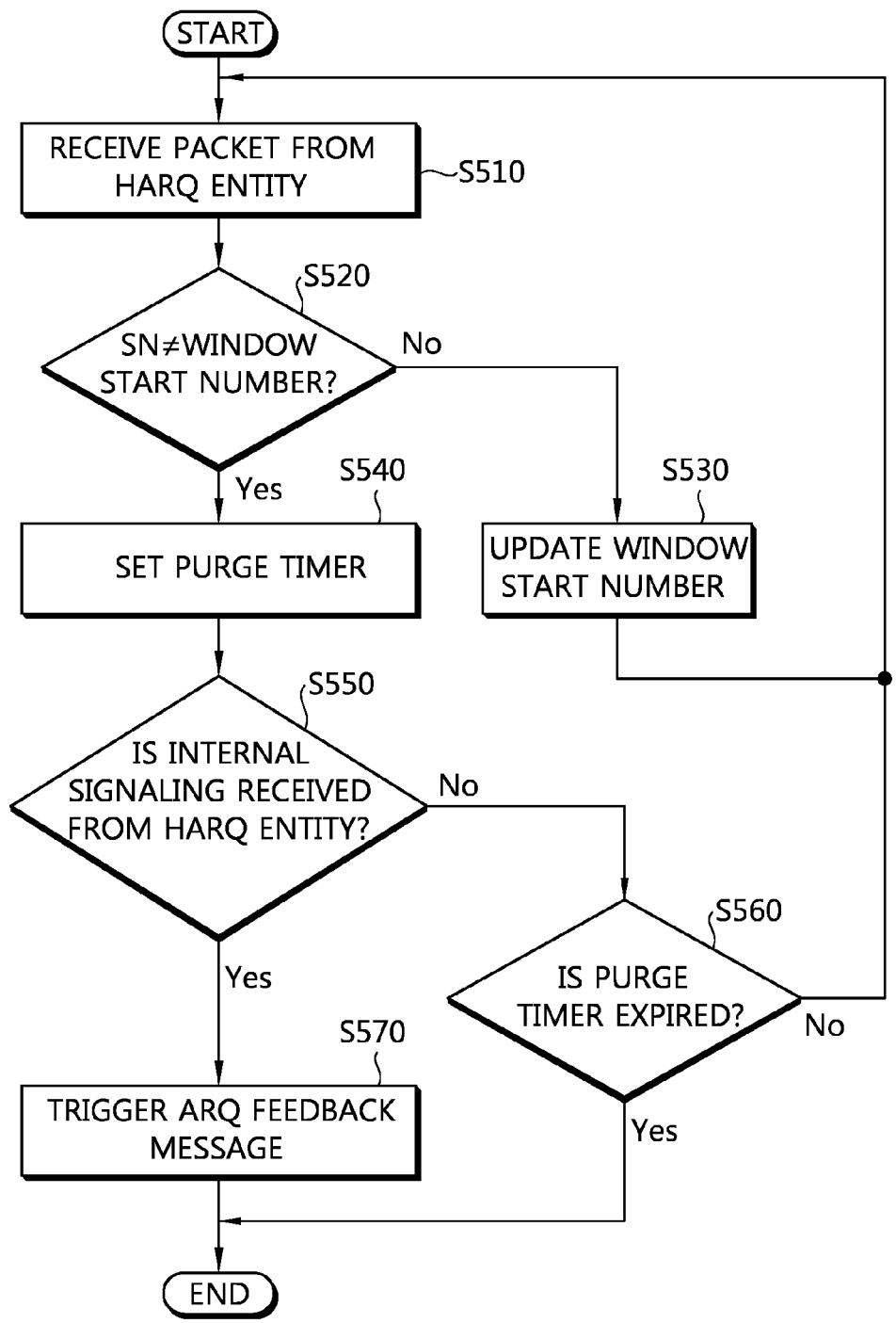
FIG. 9 is a flowchart showing a case where an ARQ feedback message is triggered by internal signaling in an ARQ entity of a receiver.

FIG. 9 is a flowchart showing a case where an ARQ feedback message is triggered by internal signaling in an ARQ entity of a receiver.

Referring to FIG. 9, the ARQ entity receives a packet from an HARQ entity (step S510). The ARQ entity determines whether an SN of the packet is equal to a window start number of an ARQ window (step S520). If the SN is equal to the window start number, the ARQ entity updates the window start number (step S530). If the SN is not equal to the window start number, the ARQ entity sets a purge timer (step S540). For example, the window start number is 3, and the SN of the packet received from the HARQ entity is 4. In this case, for the SN of 3, a blank appears in the ARQ window. Hereinafter, a packet having a blank in the ARQ window is referred to as a blank packet.

The ARQ entity determines whether internal signaling for reporting an NACK-ACK error is received from the HARQ entity (step S550). If the ARQ entity fails to receive the internal signaling, the ARQ entity determines whether the purge timer is expired (step S560). If the ARQ entity receives the internal signaling, the ARQ feedback message is triggered (step S570).

The NACK-ACK error occurs with respect to the blank packet. When the internal signaling for the blank packet is received from the HARQ entity, the ARQ entity knows that HARQ retransmission is no longer useful to solve the problem of the blank in the ARQ window with respect to the blank packet. To solve the problem of the blank in the ARQ window, the ARQ entity of the receiver may transmit an NACK-ACK error indication message for triggering retransmission of the blank packet to the ARQ entity of the transmitter. The ARQ feedback message may be used as the NACK-ACK error indication message. Alternatively, an MAC management message or an MAC header may be newly defined as the NACK-ACK error indication message. The NACK-ACK error indication message may include an SN of the blank packet.

The NACK-ACK error indication message can be transmitted without a normal resource request procedure since the NACK-ACK error indication message is sensitive to delay. In this case, a bandwidth stealing method can be used. The bandwidth stealing method is a method in which a resource allocated by an MS for the purpose of data transmission is used for another purpose.

As such, the internal signaling between the HARQ entity and the ARQ entity may be used as an NACK-ACK error recovery mechanism.

Next, a format of an ARQ feedback message will be described.

First, an ARQ feedback message of the IEEE 802.16e system can be reused for the format of the ARQ feedback message.

Second, an optimized ARQ feedback message can be newly defined. In this case, a signaling overhead can be decreased in comparison with the ARQ feedback message of the IEEE 802.16e system.

Third, a new extended header format for the ARQ feedback message can be defined, and the format can be transmitted by being attached to a header of an MAC PDU.

Fourth, a new header of an MAC PDU for the ARQ feedback message can be defined, and only the header can be independently transmitted.

A case of reusing the ARQ feedback message of the IEEE 802.16e system as the format of the ARQ feedback message will be first explained. In the IEEE 802.16e system, a data block is an ARQ block in which an MAC SDU is logically fragmented according to a predetermined size. SNs are sequentially numbered for each ARQ block. The ARQ feedback message is transmitted by being included in a payload of the MAC PDU. Whether to transmit the ARQ feedback message may be indicated by a type field of the header. In many cases, a relatively small-sized ARQ feedback message is packed with different MAC SDUs. In this case, the ARQ feedback message may be located in a front-most position in the different MAC SDUs. If it is packed with the different MAC SDUs, a PSH is located in front of the ARQ feedback message. An LEN field of the PSH indicates a length including all ARQ feedback messages.

Although the ARQ feedback message is transmitted by being included in the payload, reordering or ACK/NACK for the ARQ feedback message is not required. Therefore, the SN field and the FC field of the PSH may cause an unnecessary overhead. Accordingly, there is a need for an ARQ feedback message format capable of reducing the overhead. In addition, in the IEEE 802.16e system, one SN is assigned for each ARQ block, and transmission/retransmission is performed on an ARQ block basis. On the other hand, in the IEEE 802.16m or the 3GPP LTE, one SN is assigned for each MAC PDU, and transmission/retransmission is performed on an MAC PDU basis. That is, a data block which is a data unit for performing ARQ is the MAC PDU. If the data block is the MAC PDU and one SN is assigned for each MAC PDU, rearrangement may be problematic in MAC PDU retransmission. Therefore, the ARQ feedback message format capable of supporting rearrangement needs to be newly defined in the MAC PDU retransmission.

In a method described now, a new extended header format for the ARQ feedback message is defined, and the format is transmitted by being attached to the header of the MAC PDU. That is, an ARQ feedback extended header is newly defined and is used as an ARQ feedback message. A presence of the extended header is indicated by an EH field included in the header of the MAC PDU. The ARQ feedback extended header can be transmitted for each flow. The ARQ feedback message is for reporting ACK/NACK for data transmitted for each flow (or connection). The ARQ feedback message can also be transmitted for each flow (or connection).

Figure 10:
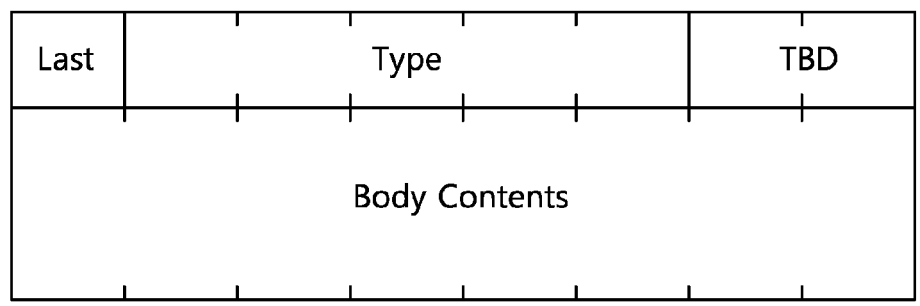
FIG. 10 shows an example of an extended header format.

FIG. 10 shows an example of an extended header format.

Referring to FIG. 10, an extended header includes a last field, a type field, and a body contents field. The last field indicates whether the extended header is followed by an additional extended header. The last field may have a size of 1 bit. The type field indicates a type of the extended header. The type field has a to-be-determined (TBD) size. The body contents field includes contents defined according to each type. The body contents field may have a size that varies depending on each type. If the type field of the extended header indicates an ARQ feedback, the extended header is an ARQ feedback extended header used as an ARQ feedback message.

Hereinafter, an extended header format for reporting an ARQ feedback in a bitmap format will be described.

Figure 11:
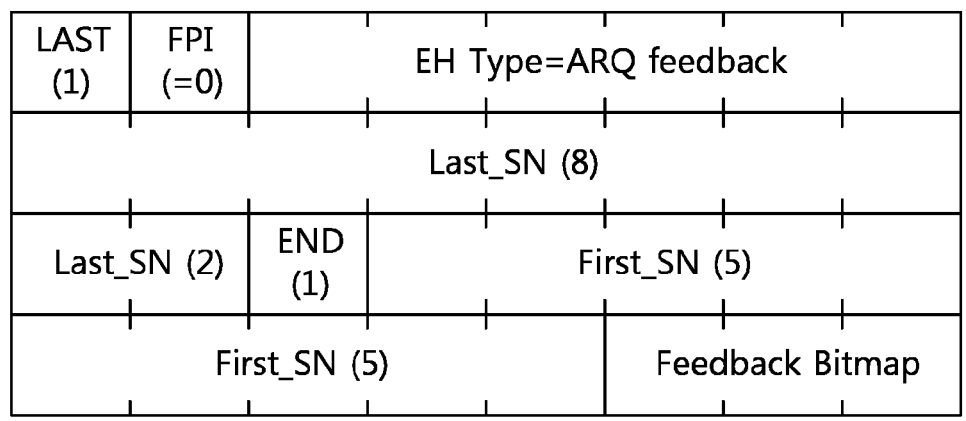
FIG. 11 shows an example of an ARQ feedback extended header format.
Figure 12:
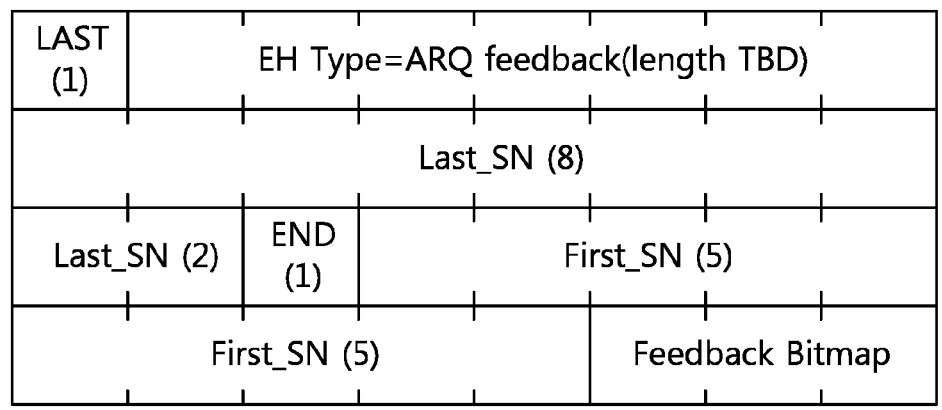
FIG. 12 shows another example of an ARQ feedback extended header format.

FIG. 11 shows an example of an ARQ feedback extended header format. FIG. 12 shows another example of an ARQ feedback extended header format. A fragmentation/packing indicator (FPI) is included in the format of FIG. 11, and is not included in the format of FIG. 12.

Referring to FIG. 11 and FIG. 12, a body contents field includes a Last_SN, an END, a First_SN, and an ACK/NACK bitmap. It is assumed herein that an SN has a length of 10 bits, but the length of the SN may differ depending on systems. The body contents field may have a size of 3 bytes or more.

The Last_SN indicates a last SN value of an ACK/NACK bitmap. The Last_SN may have a size of 10 bits. The last SN is a highest SN value of an MAC PDU for which ACK/NACK can be fed back when a receiver satisfies an ARQ feedback triggering condition.

The END indicates whether the END is followed by the First_SN. The END may have a size of 1 bit. If the receiver successfully receives all MAC PDUs up to the last SN, a value of the END is set to 0. A transmitter can receive an ARQ feedback extended header having a total size of 3 bytes. If the receiver has to feed back one or more NACKs, the value of the END is set to 1, and the END is followed by the First_SN.

The First_SN indicates a first SN value of the ACK/NACK bitmap. The First_SN may have a size of 10 bits. The first SN may a lowest SN among MAC PDUs for which NACK is determined by the receiver. Alternatively, the first SN may be a value obtained by adding 1 to the SN which is last fed back by the receiver.

The ACK/NACK bitmap indicates ACK/NACK from the First_SN to the Last_SN in a bitmap format. The ACK/NACK bitmap may be byte-aligned.

Figure 14:
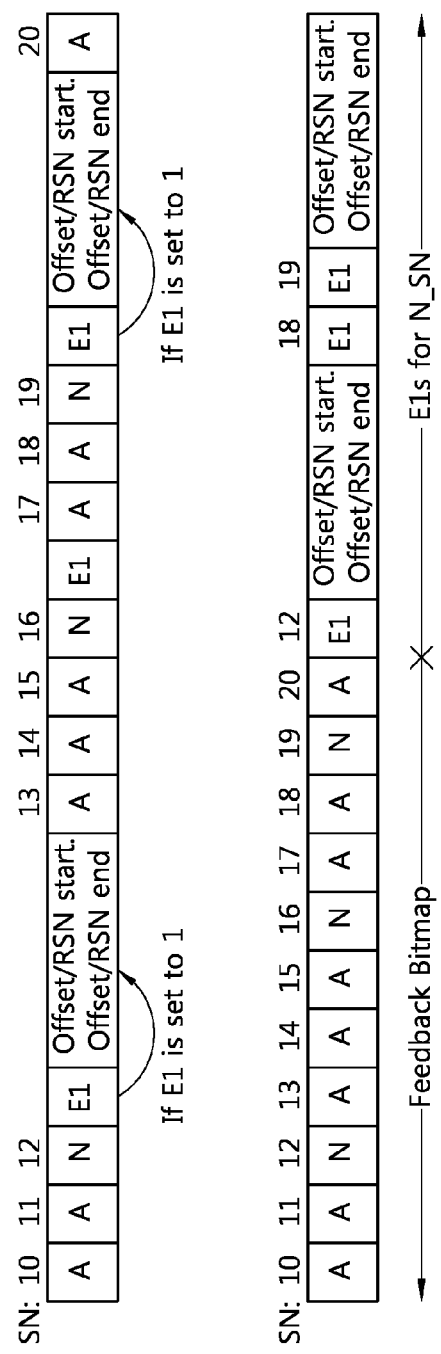
FIG. 14 shows a second example of an ACK bitmap.
Figure 15:
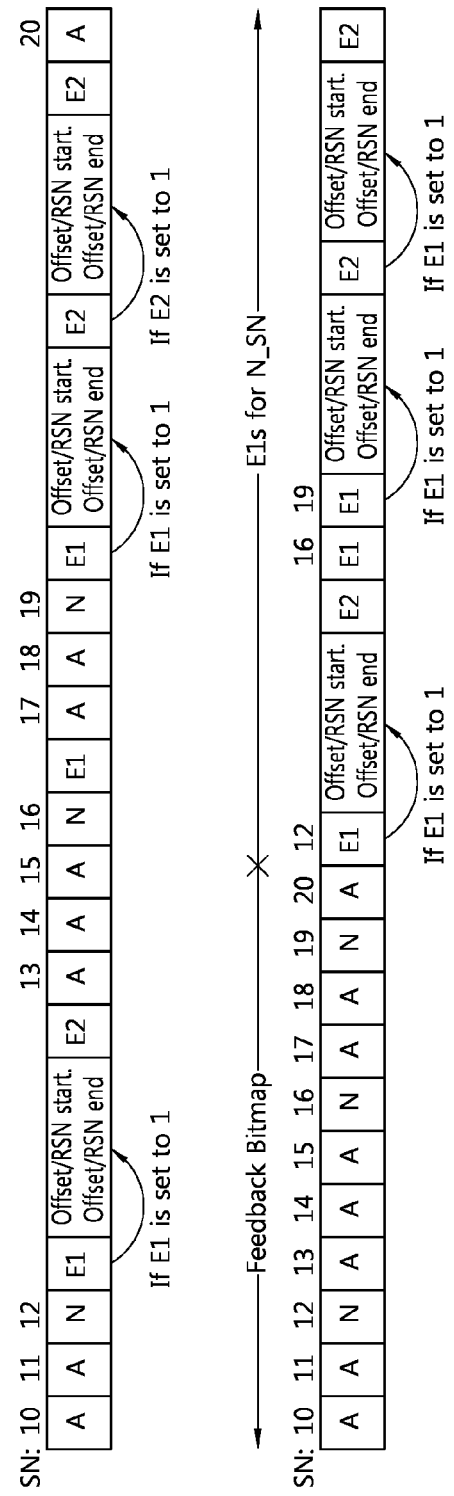
FIG. 15 shows a third example of an ACK bitmap.

FIG. 13 shows a first example of an ACK bitmap. FIG. 14 shows a second example of an ACK bitmap. FIG. 15 shows a third example of an ACK bitmap. In the examples of FIG. 13 to FIG. 15, a First_SN is 10, a Last_SN is 20, and a receiver incorrectly receives MAC PDUs having SNs of 12, 16, and 19.

Referring to FIG. 13, the ACK/NACK bitmap indicates ACK/NACK for each SN. One bit is assigned for each SN in an ACK/NACK feedback. Each bit of the ACK/NACK bitmap represents ACK/NACK of a corresponding SN. For example, ACK can be expressed by 1, and NACK can be expressed by 0.

However, an SN with NACK may be a feedback for a retransmitted MAC PDU. The retransmitted MAC PDU may be a rearranged MAC PDU. The MAC PDU transmitted by being rearranged may be a part of an initial MAC PDU. The receiver may request retransmission only for a part of MAC PDUs having the same SN.

Referring to FIG. 14, a feedback of an SN with NACK is always followed by additional transmission of E1. The E1 may be located immediately behind NACK. Alternatively, the E1 may be separately located behind an ACK/NACK bitmap.

The E1 indicates whether the E1 is followed by a reset sequence number (RSN) set. The RSN set includes RSN_start and RSN_end. The RSN_start indicates a position of a first byte which is a part of an MAC PDU rearranged in an initial MAC PDU. The RSN_end indicates a position of a last byte which is a part of the MAC PDU rearranged in the initial MAC PDU.

However, a feedback may be required for a plurality of discontinuous portions in MAC PDUs transmitted by being rearranged. Referring to FIG. 15, the E1 and the RSN set are followed by additional transmission of E2.

Figure 16:
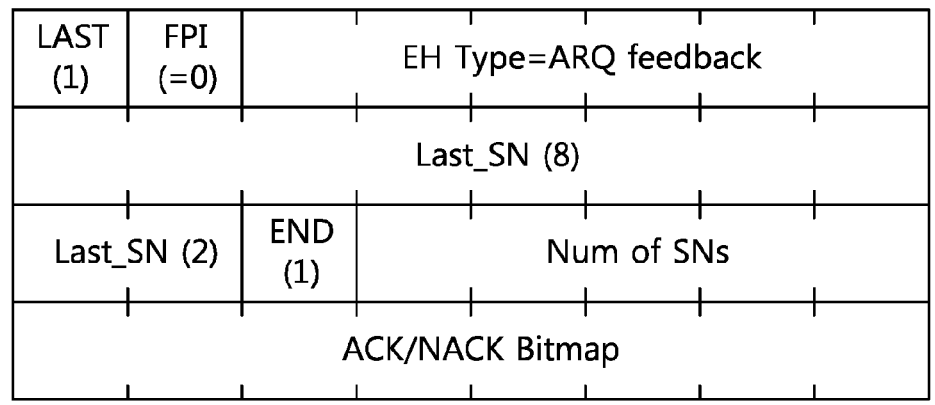
FIG. 16 shows another example of an ARQ feedback extended header format.
Figure 17:
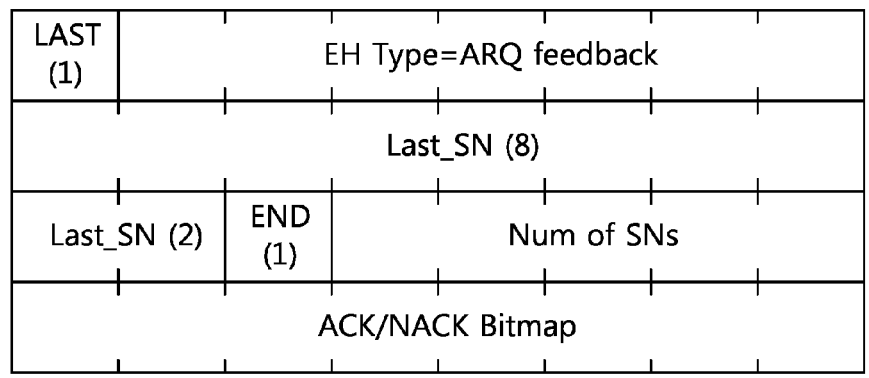
FIG. 17 shows another example of an ARQ feedback extended header format.

FIG. 16 and FIG. 17 show another example of an ARQ feedback extended header format. An FPI is included in the format of FIG. 16, and is not included in the format of FIG. 17.

Referring to FIG. 16 and FIG. 17, a body contents field includes a Last_SN, an END, the number of SNs, and an ACK/NACK bitmap.

The END indicates whether the END is followed by the number of SNs. If a receiver successfully receives all MAC PDUs up to a last SN, a value of the END is set to 0. A transmitter may receive an ARQ feedback extended header of 3 bytes in total. If the receiver has to feed back one or more NACKs, the value of the END is set to 1, and the END is followed by the number of SNs.

The number of SNs indicates a size of the ACK/NACK bitmap. The number of SNs may be equal to a 'Last_SN—a lowest SN among MAC PDUs for which NACK is determined by the receiver'. Alternatively, the number of SNs may be equal to a 'Last_SN—a last fed back S+1'. The aforementioned content may be used by reference for other unexplained parts in the body contents field of FIG. 16 and FIG. 17.

Figure 18:
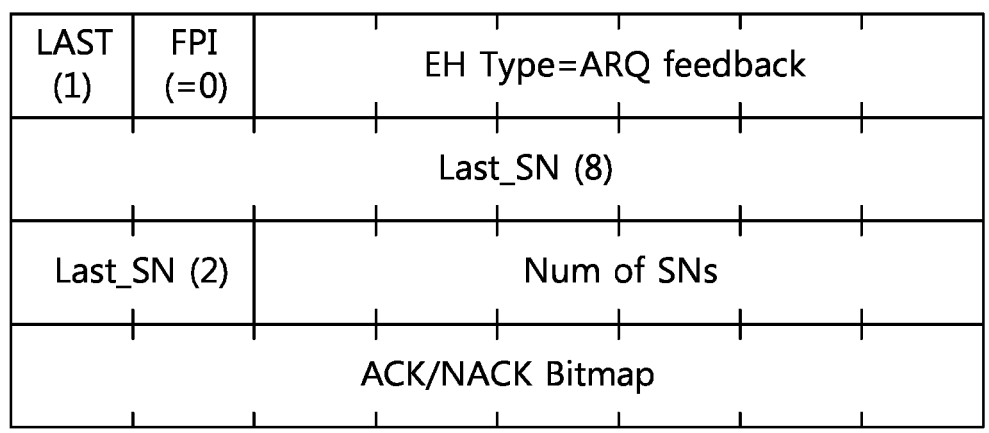
FIG. 18 shows another example of an ARQ feedback extended header format.
Figure 19:
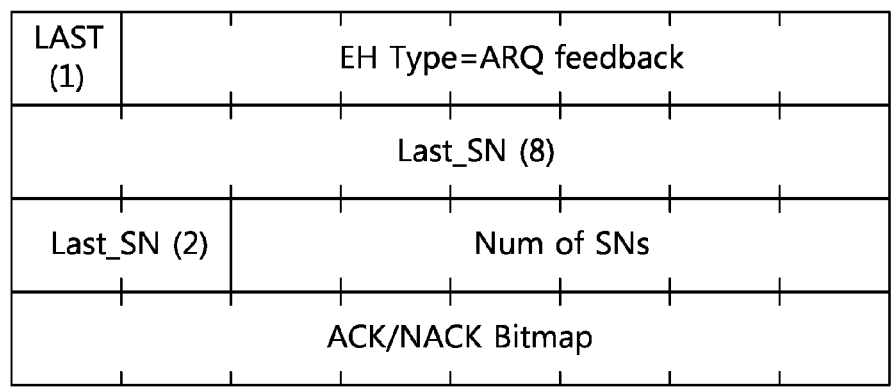
FIG. 19 shows another example of an ARQ feedback extended header format.

FIG. 18 and FIG. 19 show another example of an ARQ feedback extended header format. An FPI is included in the format of FIG. 18, and is not included in the format of FIG. 19.

Referring to FIG. 18 and FIG. 19, a body contents field includes a Last_SN, the number of SNs, and an ACK/NACK bitmap. The number of SNs indicates a size of the ACK/NACK bitmap. If the number of SNs is 0, the number of SNs is not followed by the ACK/NACK bitmap.

Next, an ARQ feedback extended header for transmitting a selective NACK will be described. The ARQ feedback extended header for the selective NACK to be described below may be an ARQ feedback extended header for transmitting the selective ACK by using ACK instead of NACK.

Figure 20:
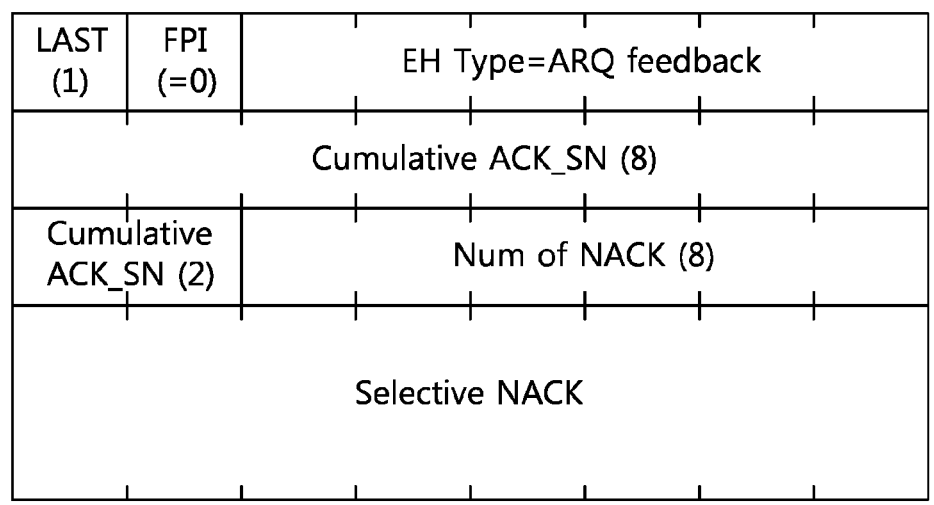
FIG. 20 shows another example of an ARQ feedback extended header format.
Figure 21:
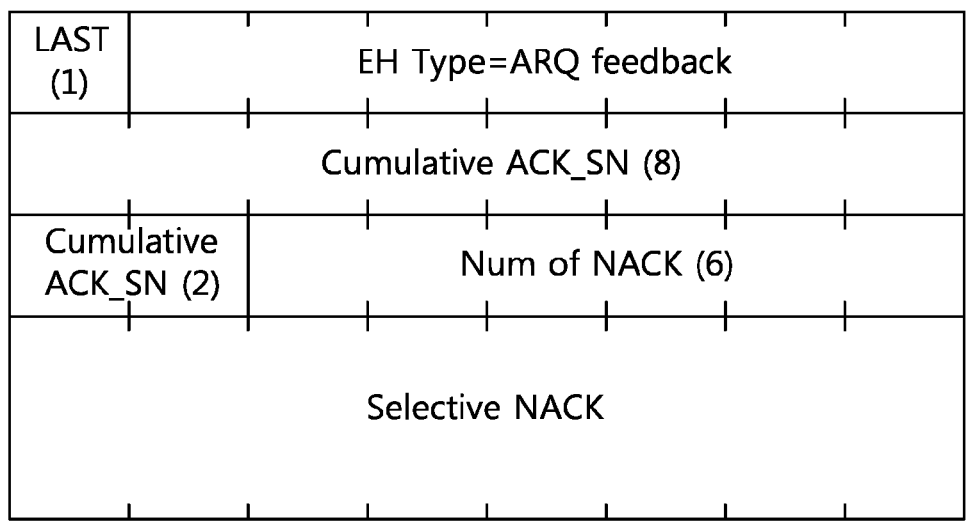
FIG. 21 shows another example of an ARQ feedback extended header format.

FIG. 20 and FIG. 21 show another example of an ARQ feedback extended header format. An FPI is included in the format of FIG. 20, and is not included in the format of FIG. 21.

Referring to FIG. 20 and FIG. 21, a body contents field includes a cumulative SN, the number of NACKs, and a selective NACK.

The cumulative SN indicates an SN value of a last MAC PDU which is successfully continuously received by a receiver. If the receiver successfully receives all MAC PDUs when an ARQ feedback extended header is generated, there is no NACK. A value indicating the number of NACKs is 0, and the ARQ feedback extended header may have a length of 3 bytes.

The number of NACKs indicates the number of selective NACKs. If the number of NACKs is 0, it indicates that the number of NACKs is not followed by the selective NACK.

Figure 22:
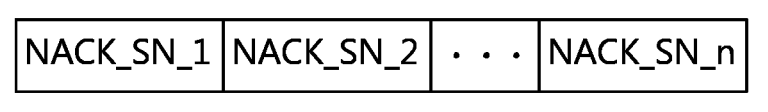
Figure 23:
FIG. 23 shows a second example of a selective NACK.
Figure 24:
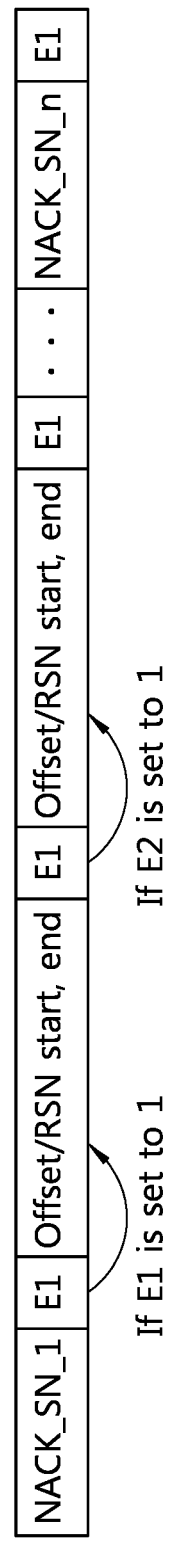
FIG. 24 shows a third example of a selective NACK.

FIG. 22 shows a first example of a selective NACK. FIG. 23 shows a second example of a selective NACK. FIG. 24 shows a third example of a selective NACK.

Referring to FIG. 22, regarding the selective NACK, SNs of MAC PDUs of which reception is determined to be a failure by a receiver are sequentially fed back, wherein the number of SNs is equal to the number of NACKs. In FIG. 22, n denotes the number of NACKs.

Referring to FIG. 23, if a rearranged MAC PDU is not correctly received, E1 is used for a partial feedback of an NACK SN. If a value of the E1 is 1, an RSN set is added and transmitted for the partial feedback. The RSN set includes RSN_start and RSN_end. If the value of the E1 is 0, the E1 may be followed by a next NACK SN.

However, if the MAC PDU corresponding to the NACK SN is transmitted by being rearranged into a plurality of MAC PDUs, a feedback may be required for a plurality of discontinuous portions of the MAC PDU. Referring to FIG. 24, the E1 and the RSN set are followed by additional transmission of E2.

As such, an ARQ feedback extended header for transmitting a cumulative and selective NACK can be generated by using the number of NACK SNs.

Next, an ARQ feedback extended header using an extended bit will be described. Hereinafter, the ARQ feedback extended header for a selective NACK described below may be an ARQ feedback extended header for transmitting a selective ACK by using ACK instead of NACK.

Figure 25:
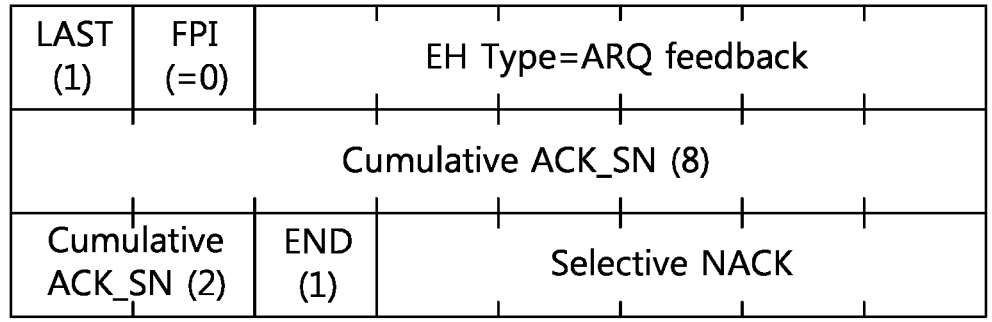
FIG. 25 shows another example of an ARQ feedback extended header format.

FIG. 25 and FIG. 26 show another example of an ARQ feedback extended header format. An FPI is included in the format of FIG. 25, and is not included in the format of FIG. 26.

Referring to FIG. 25 and FIG. 26, a body contents field includes a cumulative SN, an END, and a selective NACK. If a receiver successfully receives all MAC PDUs up to the cumulative SN, there is no NACK. A value of the END is 1. If the value of the END is 1, the END is not followed by the selective NACK. If the value of the END is 0, the END is followed by a first NACK SN.

Figure 27:
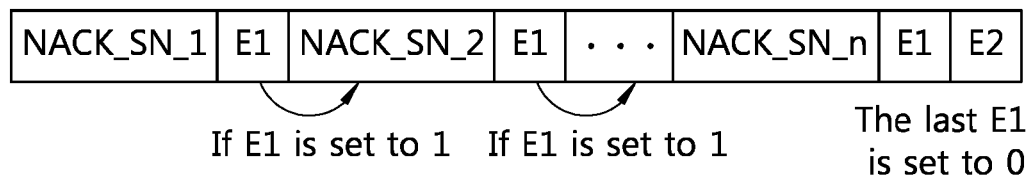
FIG. 27 shows a first example of a selective NACK using an extended bit.
Figure 28:
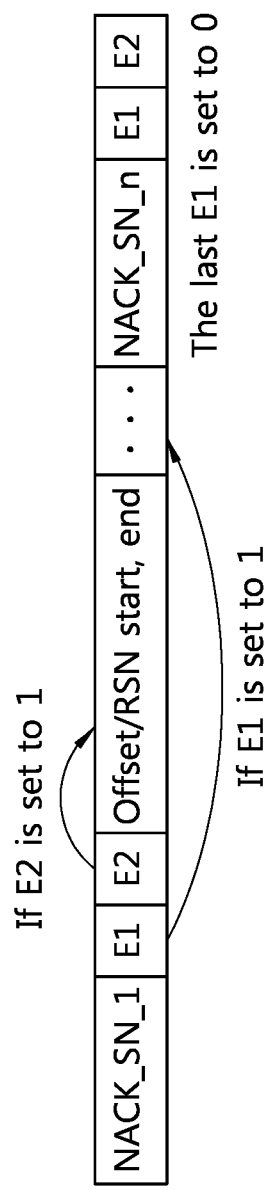
FIG. 28 shows a second example of a selective NACK using an extended bit.
Figure 29:
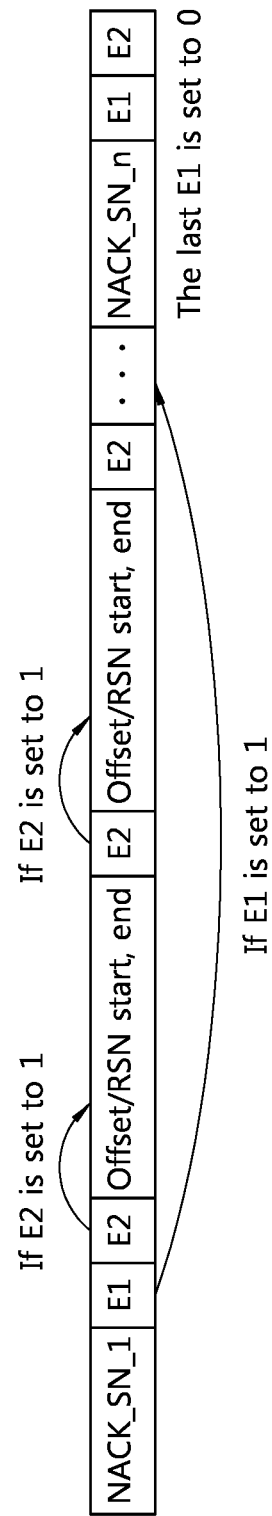
FIG. 29 shows a third example of a selective NACK using an extended bit.

FIG. 27 shows a first example of a selective NACK using an extended bit. FIG. 28 shows a second example of a selective NACK using an extended bit. FIG. 29 shows a third example of a selective NACK using an extended bit.

Referring to FIG. 27, regarding the selective NACK, a SN of an MAC PDU of which reception is determined to be a failure by a receiver (i.e., NACK SN) and an E1 bit are sequentially fed back. The E1 bit reports whether a next NACK SN is transmitted.

Referring to FIG. 28, if a rearranged MAC PDU is not correctly received, an E2 bit is used for a partial feedback of an NACK SN. If a value of the E2 bit is 1, an RSN set is added and transmitted for the partial feedback. The RSN set includes RSN_start and RSN_end. If the value of the E2 bit is 0, the RSN set is not added. The NACK SN is continued until a value of the E1 bit is 0.

However, if the MAC PDU corresponding to the NACK SN is transmitted by being rearranged into a plurality of MAC PDUs, a feedback may be required for a plurality of discontinuous portions of the MAC PDU. Referring to FIG. 29, the E1 bit, the E2 bit, and the RSN set are followed by additional transmission of an E3 bit.

Figure 30:
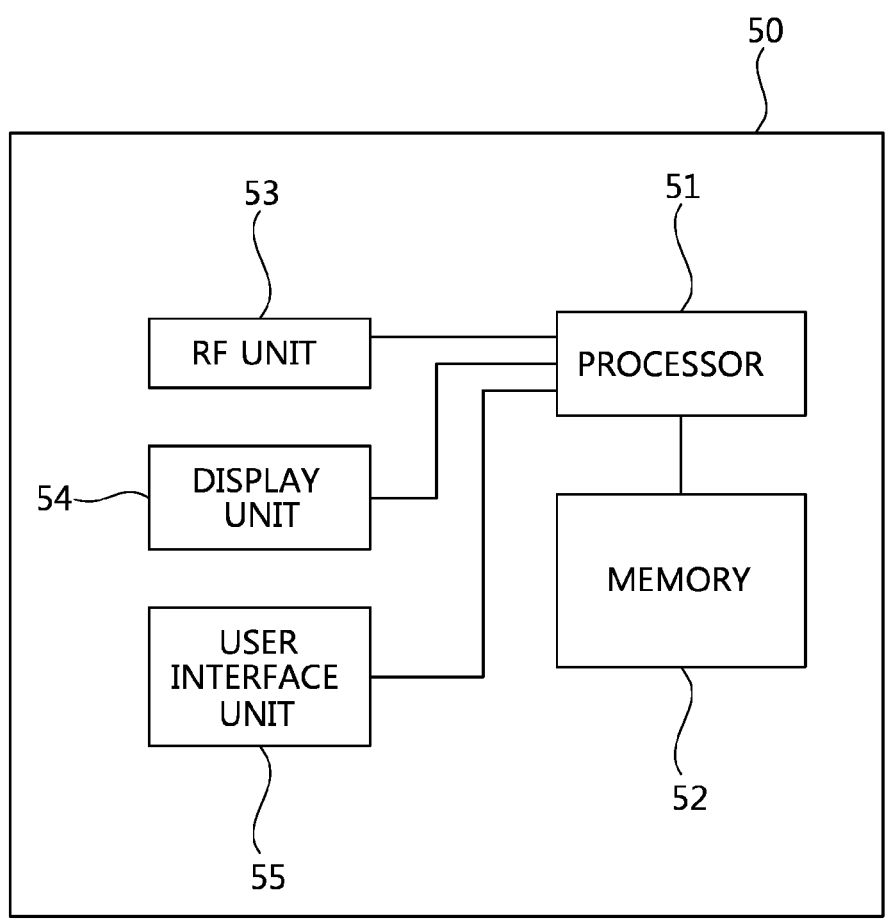
FIG. 30 is a block diagram showing an apparatus for wireless communication.

FIG. 30 is a block diagram showing an apparatus for wireless communication. An apparatus 50 for wireless communication may be a part of an MS. The apparatus 50 for wireless communication includes a processor 51, a memory 52, a radio frequency (RF) unit 53, a display unit 54, and a user interface unit 55. The RF unit 53 is coupled to the processor 51 and transmits and/or receives radio signals. The memory 52 is coupled to the processor 51 and stores an operating system, applications, and general files. The display unit 54 displays a variety of information of the MS and may use a well-known element such as a liquid crystal display (LCD), an organic light emitting diode (OLED), etc. The user interface unit 55 can be configured with a combination of well-known user interfaces such as a keypad, a touch screen, etc. The processor 51 implements the aforementioned HARQ entity and ARQ entity, and performs all methods related to data block transmission, HARQ performance, ARQ performance, an interaction between HARQ and ARQ, etc.

When a physical layer supports HARQ, the number of unnecessary transmissions of an ARQ feedback message and the number of unnecessary retransmission of an ARQ block can be reduced by interaction between HARQ and ARQ. In addition, reliability of an HARQ feedback can be complemented. For example, a problem unsolvable by an HARQ entity, such as an NACK-ACK error, can be rapidly recovered by an ARQ entity. Accordingly, quality of service (QoS) can be further satisfied, and reliability of wireless communication can be improved. Therefore, overall system performance can be improved.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a data block in a wireless communication system, the method comprising:
   transmitting, by a transmitter, the data block to a hybrid automatic repeat request (HARQ) entity of a receiver;
   receiving, by the transmitter from the HARQ entity of the receiver, a HARQ not-acknowledgement (NACK) indicating a reception failure, by the receiver, of the data block due to an acknowledgement (ACK)-NACK error that occurs when the HARQ NACK transmitted by the HARQ entity of the receiver is actually a HARQ ACK;
   receiving, by the transmitter from an automatic repeat request (ARQ) entity of the receiver, an ARQ feedback message indicating a reception success, by the receiver, of the data block,
   wherein a polling indicator is transmitted for triggering transmission of the ARQ feedback message,
   wherein the ARQ feedback message is periodically transmitted using a header of a medium access control (MAC) protocol data unit (PDU),
   wherein the ARQ feedback message is transmitted by the ARQ entity of the receiver after performing the steps of:
      detecting the NACK-ACK error by the HARQ entity of the receiver; and
      transmitting internal signaling for reporting the NACK-ACK error by the HARQ entity of the receiver to the ARQ entity of the receiver,
   wherein the ARQ feedback message is transmitted without a normal resource request procedure; and
   confirming, by the transmitter, the reception success of the data block by using the ARQ feedback message.

2. The method of claim 1, wherein the step of transmitting the data block to the HARQ entity of the receiver comprises:
   generating the data block by an ARQ entity of the transmitter;
   transmitting the generated data block to a HARQ entity of the transmitter;
   attaching cyclic redundancy check (CRC) to the data block by the HARQ entity of the transmitter; and
   transmitting the CRC-attached data block by the HARQ entity of the transmitter.

3. The method of claim 2, wherein the ARQ entity of the transmitter is a higher layer of the HARQ entity of the transmitter.

4. The method of claim 2, wherein the ARQ entity of the transmitter is a MAC layer, and the HARQ entity of the transmitter is a physical layer.

5. The method of claim 2, wherein the HARQ NACK is received by the HARQ entity of the transmitter, and the ARQ feedback message is received by the ARQ entity of the transmitter.

6. The method of claim 5, wherein the HARQ NACK is transmitted by the HARQ entity of the transmitter to the ARQ entity of the transmitter.

7. An apparatus for wireless communication, comprising:
   a radio frequency (RF) unit; and
   a processor coupled to the RF unit and configured to:
      transmit a data block to a hybrid automatic repeat request (HARQ) entity of a receiver,
      receive, from the HARQ entity of the receiver, a HARQ not-acknowledgement (NACK) indicating a reception failure, by the receiver, of the data block due to an acknowledgement (ACK)-NACK error that occurs when the HARQ NACK transmitted by the HARQ entity of the receiver is actually a HARQ ACK,
      receive, from an automatic repeat request (ARQ) entity of the receiver, an ARQ feedback message indicating a reception success, by the receiver, of the data block
      wherein a polling indicator is transmitted for triggering transmission of the ARO feedback message,
      wherein the ARQ feedback message is periodically transmitted using a header of a medium access control (MAC) protocol data unit (PDU),
      wherein the ARQ feedback message is transmitted by the ARQ entity of the receiver after performing the steps of:
         detecting the NACK-ACK error by the HARQ entity of the receiver; and
         transmitting internal signaling for reporting the NACK-ACK error by the HARQ entity of the receiver to the ARQ entity of the receiver,
      wherein the ARQ feedback message is transmitted without a normal resource request procedure; and
      confirm the reception success of the data block by using the ARQ feedback message.

* * * * *